(12) United States Patent
Yamagata

(10) Patent No.: US 11,503,257 B2
(45) Date of Patent: Nov. 15, 2022

(54) LIGHT SOURCE DEVICE AND PROJECTION IMAGE DISPLAY DEVICE

(71) Applicant: Panasonic Intellectual Property Management Co., Ltd., Osaka (JP)

(72) Inventor: Yuki Yamagata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 61 days.

(21) Appl. No.: 17/110,801

(22) Filed: Dec. 3, 2020

(65) Prior Publication Data

US 2021/0195147 A1  Jun. 24, 2021

(30) Foreign Application Priority Data

Dec. 18, 2019 (JP) .............................. JP2019-228264

(51) Int. Cl.
*G03B 21/20* (2006.01)
*H04N 9/31* (2006.01)

(52) U.S. Cl.
CPC ......... *H04N 9/3152* (2013.01); *G03B 21/208* (2013.01); *G03B 21/2013* (2013.01); *G03B 21/2033* (2013.01); *G03B 21/2066* (2013.01)

(58) Field of Classification Search
CPC ............ G03B 21/2066; G03B 21/2013; G03B 21/208
See application file for complete search history.

(56) References Cited

U.S. PATENT DOCUMENTS

| 2009/0141242 | A1 | 6/2009 | Silverstein et al. | |
| 2010/0328633 | A1* | 12/2010 | Sato | G02B 19/0066 362/235 |
| 2015/0146173 | A1* | 5/2015 | Huang | G03B 21/2033 353/31 |
| 2015/0316234 | A1* | 11/2015 | Samonji | G03B 21/2033 362/382 |
| 2016/0223890 | A1 | 8/2016 | Okuda | |
| 2017/0176845 | A1 | 6/2017 | Ogino | |
| 2020/0341359 | A1* | 10/2020 | Hayashi | G03B 21/204 |
| 2021/0278683 | A1* | 9/2021 | Hou | G02B 19/0057 |
| 2021/0321066 | A1* | 10/2021 | Yogo | G03B 21/204 |

FOREIGN PATENT DOCUMENTS

| JP | 2011-505593 | 2/2011 |
| JP | 2013-72942 | 4/2013 |
| JP | 2016-145966 | 8/2016 |
| JP | 2017-116906 | 6/2017 |
| WO | 2009/073089 | 6/2009 |

* cited by examiner

*Primary Examiner* — William N Harris
(74) *Attorney, Agent, or Firm* — Wenderoth, Lind & Ponack, LLP

(57) ABSTRACT

A light source device includes: a first reflector having a first reflective surface; a second reflector having a second reflective surface that is parallel to the first reflective surface and is located in a space behind the first reflective surface with respect to a normal direction of the first reflective surface; a first light source that emits a first light beam directed to the first reflective surface; and a second light source emitting a second light beam that is parallel to the first light beam. The second light beam is directed to the second reflective surface through a space in front of the first reflective surface.

18 Claims, 10 Drawing Sheets

LIGHT SOURCE DEVICE AND PROJECTION IMAGE DISPLAY DEVICE

BACKGROUND

1. Technical Field

The present disclosure relates to, for example, a light source device and a projection image display device including the light source device.

2. Description of the Related Art

Conventionally, there is a light source device that decreases a pitch between light beams of linear light emitted from a plurality of light sources. For example, in Unexamined Japanese Patent Publication No. 2013-72942, light beams emitted from a plurality of light sources are reflected by reflection mirrors disposed corresponding to the light beams, by which the pitch between the light beams is decreased.

SUMMARY

When the pitch between the plurality of light sources is narrow, the pitch between the light beams is further decreased due to reflection by the reflection mirrors, resulting in that the usable range of light is narrowed.

An object of the present disclosure is to provide a light source device and a projection image display device that emit light beams with a pitch larger than the pitch between light sources.

The light source device according to the present disclosure includes:
- a first reflector having a first reflective surface;
- a second reflector having a second reflective surface that is parallel to the first reflective surface and is located in a space behind the first reflective surface with respect to a normal direction of the first reflective surface;
- a first light source that emits a first light beam directed to the first reflective surface; and
- a second light source that emits a second light beam that is parallel to the first light beam, the second light beam being directed to the second reflective surface through a space in front of the first reflective surface.

A projection image display device according to the present disclosure includes:
- the light source device;
- a light modulation element that modulates light incident from the light source device on the basis of an external signal; and
- a projection lens unit that magnifies and projects the light modulated by the light modulation element.

The present disclosure can provide a light source device and a projection image display device that emit light beams with a pitch larger than the pitch between light sources.

DETAILED DESCRIPTION

Exemplary embodiments will be described in detail below with reference to the drawings as appropriate. However, detailed descriptions more than necessary may be omitted. For example, a detailed description of a matter which is already well-known and a repeated description for a substantially identical configuration may be omitted. This is to avoid unnecessary redundancy in the following description and to facilitate understanding of those skilled in the art.

The inventor(s) of the present disclosure provides the appended drawings and the following description in order to allow those skilled in the art to fully understand the present disclosure, and does not intend to limit the subject matter described in the appended claims by the appended drawings and the following description.

First Exemplary Embodiment

A first exemplary embodiment will be described below with reference to FIG. 1.

[1-1. Configuration]

Figure 1:
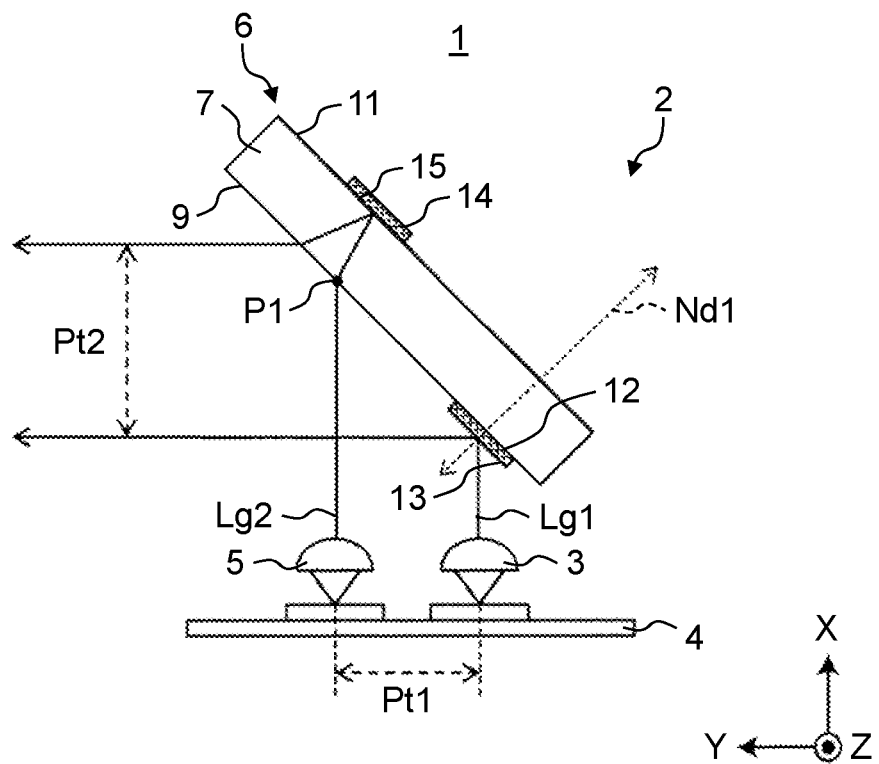
FIG. 1 is a schematic side view of a light source device according to a first exemplary embodiment of the present disclosure.

FIG. 1 is a side view for describing a configuration of light source device 1 according to the present disclosure. For convenience of the following description, an XYZ orthogonal coordinate system, which is shown in FIG. 1, is adopted in FIG. 1.

Light source device 1 includes light source module 2. Light source module 2 includes first light source 3, second light source 5, and first reflection module 6. Light source device 1 may include substrate 4 on which first light source 3 and second light source 5 are disposed.

First light source 3 is, for example, a light source array having a plurality of solid-state light source elements 3a (see FIG. 4) arranged in one direction (Z direction) and collimator lenses arranged corresponding to solid-state light source elements 3a. Solid-state light source elements 3a are, for example, semiconductor lasers. The semiconductor laser that is an excitation light source is, for example, a blue semiconductor laser that emits blue light with a wavelength range of 447 nm to 462 nm and radiates linearly polarized light. Optical axes of light beams emitted from the respective solid-state light source elements are parallel.

Second light source 5 is, for example, a light source array having a plurality of solid-state light source elements 5a (see FIG. 4) arranged in one direction (Z direction) and collimator lenses arranged corresponding to solid-state light source elements 5a. Solid-state light source elements 5a are, for example, semiconductor lasers. Optical axes of light beams emitted from respective solid-state light source elements 5a are parallel. Further, optical axes of light beams emitted from solid-state light source elements 3a of first light source 3 and optical axes of light beams emitted from solid-state light source elements 5a of second light source 5 are also parallel.

First reflection module 6 has first base member 7, first reflector 12, and second reflector 14. The first base member is a light-transmissive rectangular plate member, and is, for example, a glass plate or a resin plate. First base member 7 includes first main surface 9 that faces first light source 3 and second light source 5, and second main surface 11 that faces first main surface 9. First main surface 9 and second main surface 11 are parallel to each other.

First main surface 9 is provided with first reflector 12 having first reflective surface 13 that totally reflects light beam Lg1 from first light source 3. First reflector 12 is located on the optical axis of light beam emitted from first light source 3. Second main surface 11 is provided with second reflector 14 having second reflective surface 15 that totally reflects light beam Lg2 from second light source 5. First reflector 12 and second reflector 14 are, for example, metal films or dielectric multilayer films, and are formed by sputtering, vapor deposition, or the like.

Figure 4:
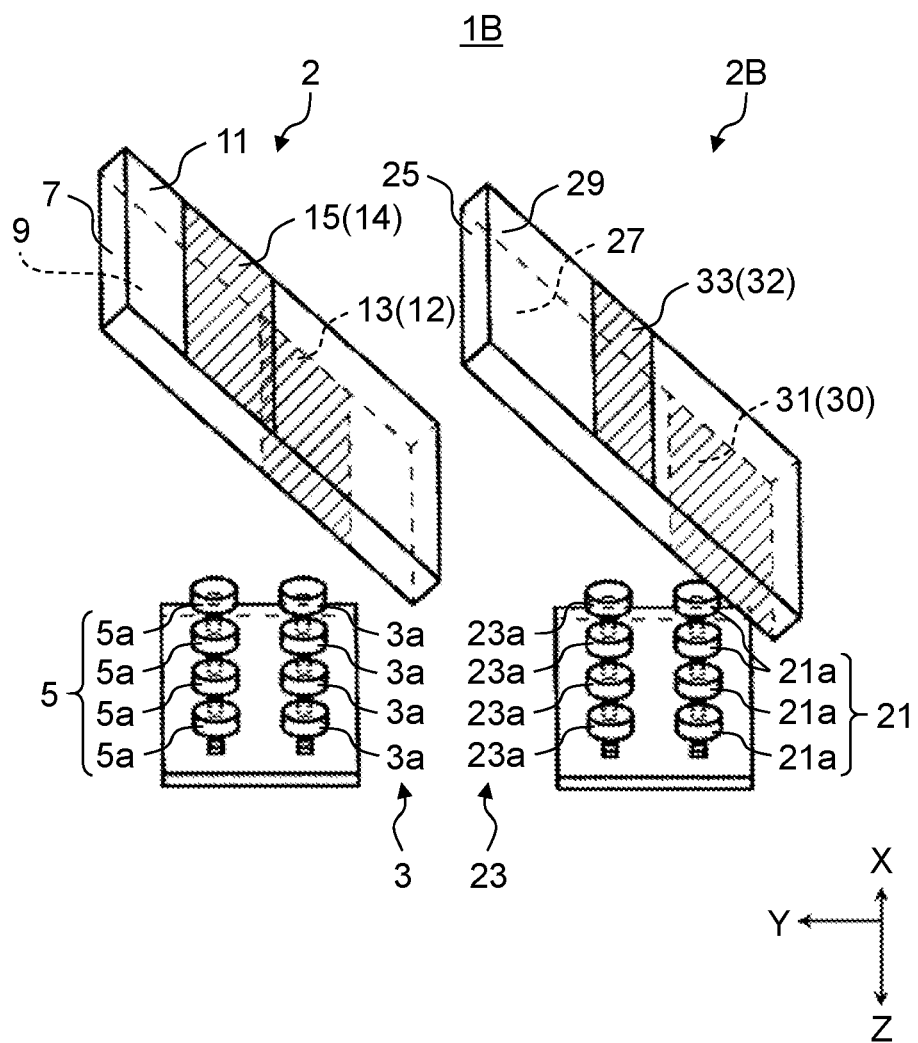
FIG. 4 is a schematic perspective view of the light source device as viewed from a first reflection module and a second reflection module.

First reflective surface 13 and second reflective surface 15 have a rectangular shape extending in the Z direction along the solid-state light source arrays of first light source 3 and second light source 5 (see FIG. 4).

Second reflector 14 is disposed at a position farther from first light source 3 and second light source 5 than a virtual plane including first reflective surface 13 along the optical axes (X-axis direction) of light beams Lg1 and Lg2 from first light source 3 and second light source 5 which are not yet reflected. Second reflective surface 15 is located in a space behind first reflective surface 13 with respect to normal direction Nd1 of first reflective surface 13. In the present disclosure, the wording "second reflective surface 15 is located in the space behind first reflective surface 13 with respect to normal direction Nd1" means that second reflective surface 15 is located in a space on the side opposite to second light source 5 with respect to the virtual plane including first reflective surface 13. That is, second reflective surface 15 is not located on the virtual plane including first reflective surface 13.

First reflection module 6 is disposed such that light beam Lg1 from first light source 3 enters first reflective surface 13 at an incident angle of 45°. Therefore, light beam Lg1 reflected by first reflective surface 13 proceeds in a direction at an angle of 90° with respect to the entering light beam.

Further, in first reflection module 6, light beam Lg2 from second light source 5 is refracted at intersection P1 with first main surface 9 as a virtual plane, and enters first base member 7. The entering light beam travels in first base member 7 and is totally reflected by second reflective surface 15 on second main surface 11. That is, first reflection module 6 is configured such that light beam Lg2 is refracted by first main surface 9 and travels toward second reflective surface 15. The totally reflected light travels inside first base member 7, is refracted by first main surface 9, and is emitted from first base member 7. Therefore, the optical axis of light beam Lg2 that enters first reflection module 6 and the optical axis of light beam Lg2 that exits from first reflection module 6 are orthogonal to each other. At this time, the optical path is shifted in the X-axis direction until light beam Lg2 enters first base member 7, is reflected by second reflective surface 15, and exits from first base member 7. Therefore, pitch Pt2 between light beam Lg1 reflected by first reflective surface 13 and light beam Lg2 reflected by second reflective surface 15 and exiting from first reflection module 6 is longer than pitch Pt1 between first light source 3 and second light source 5.

As described above, light source device 1 includes second reflective surface 15 disposed in a direction away from intersection P1 (intersection between first main surface 9 including first reflective surface 13 and light beam Lg2 from second light source 5) along the optical path. Second reflective surface 15 reflects a light beam from second light source 5 such that the light beam has an optical axis parallel to the optical axis of light beam Lg1 reflected by first reflective surface 13. Further, as shown in FIG. 1, first reflector 12 and second reflector 14 reflect light beams Lg1 and Lg2 as reflected light beams parallel to each other.

[1-2. Effects and Others]

As described above, light source device 1 according to the first exemplary embodiment includes: first reflector 12 having first reflective surface 13; and second reflector 14 having second reflective surface 15 that is parallel to first reflective surface 13 and located in a space behind first reflective surface 13 with respect to normal direction Nd1 of first reflective surface 13. Light source device 1 also includes: first light source 3 that emits first light beam Lg1 directed to first reflective surface 13; and second light source 5 that emits second light beam Lg2 that is parallel to first light beam Lg1 and directed to second reflective surface 15 through a space in front of first reflective surface 13. Here, the wording "the space in front of first reflective surface 13" means "the space on a side of first light source 3 with respect to the virtual plane including first reflective surface 13".

Since second reflective surface 15 is located in the space behind first reflective surface 13 with respect to normal direction Nd1 of first reflective surface 13, the pitch between light beam Lg1 from first light source 3 reflected by first reflective surface 13 and light beam Lg2 from second light source 5 reflected by second reflective surface 15 is increased. As a result, light source device 1 having light rays with pitch Pt2 which is wider than pitch Pt1 between light sources can be provided. For example, when the thickness of first reflection module 6 is about 2.0 mm, the refractive index is 1.525, and pitch Pt1 is about 5 mm, pitch Pt2 is about 6.48 mm, and thus, the distance between optical axes can be increased by about 1.48 mm.

Figure 2:
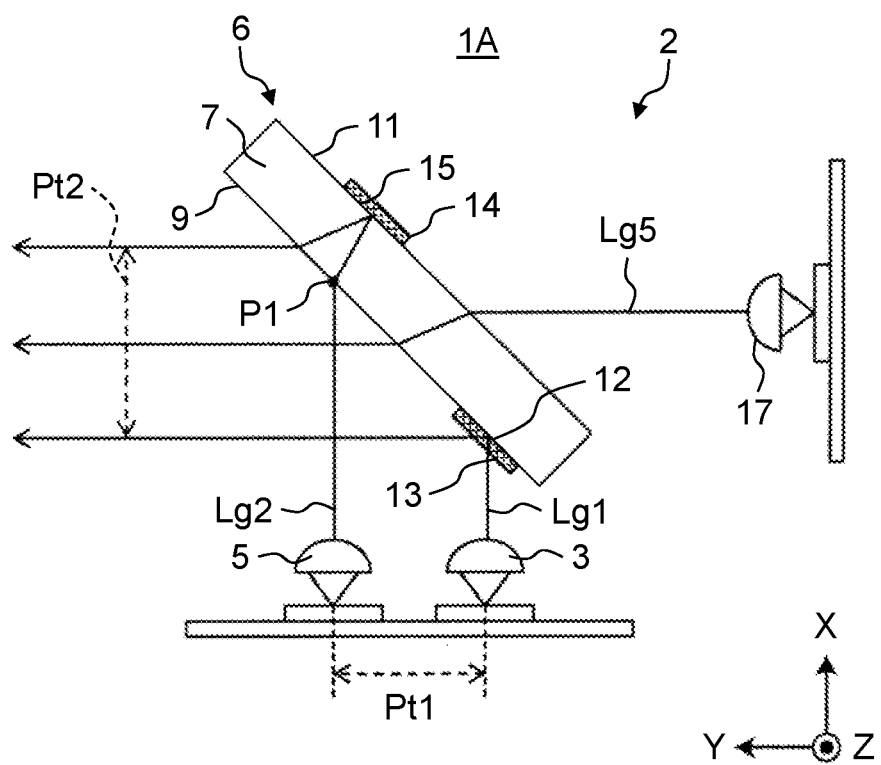
FIG. 2 is a schematic side view of a light source device according to a modification of the first exemplary embodiment of the present disclosure.

Next, a modification of the first exemplary embodiment will be described with reference to FIG. 2. Light source device 1A according to the modification of the first exemplary embodiment further includes another light source 17 in light source module 2 of the first exemplary embodiment.

Light source 17 is disposed to face second main surface 11 of first reflection module 6. Similar to first light source 3 and second light source 5, light source 17 is, for example, a light source array having a plurality of solid-state light sources arranged in one direction (Z direction). The solid-state light sources are, for example, semiconductor lasers.

Optical axes of light beams emitted from the respective solid-state light sources are parallel.

Further, light beam Lg5 emitted from light source 17 enters into first reflection module 6 after being refracted by second main surface 11 of first reflection module 6, is refracted by first main surface 9, and exits from first reflection module 6. Light source 17 is disposed such that light beam Lg5 emitted from first reflection module 6 is located between light beam Lg1 reflected by first reflective surface 13 and light beam Lg2 reflected by second reflective surface 15.

At this time, the pitch between light beam Lg1 and light beam Lg2 is increased, and thus, light beam Lg5 is easily spatially combined with light beams Lg1 and Lg2, and loss of light beam Lg5 due to reflection on first reflective surface 13 and second reflective surface 15 can be prevented.

Second Exemplary Embodiment

Figure 3:
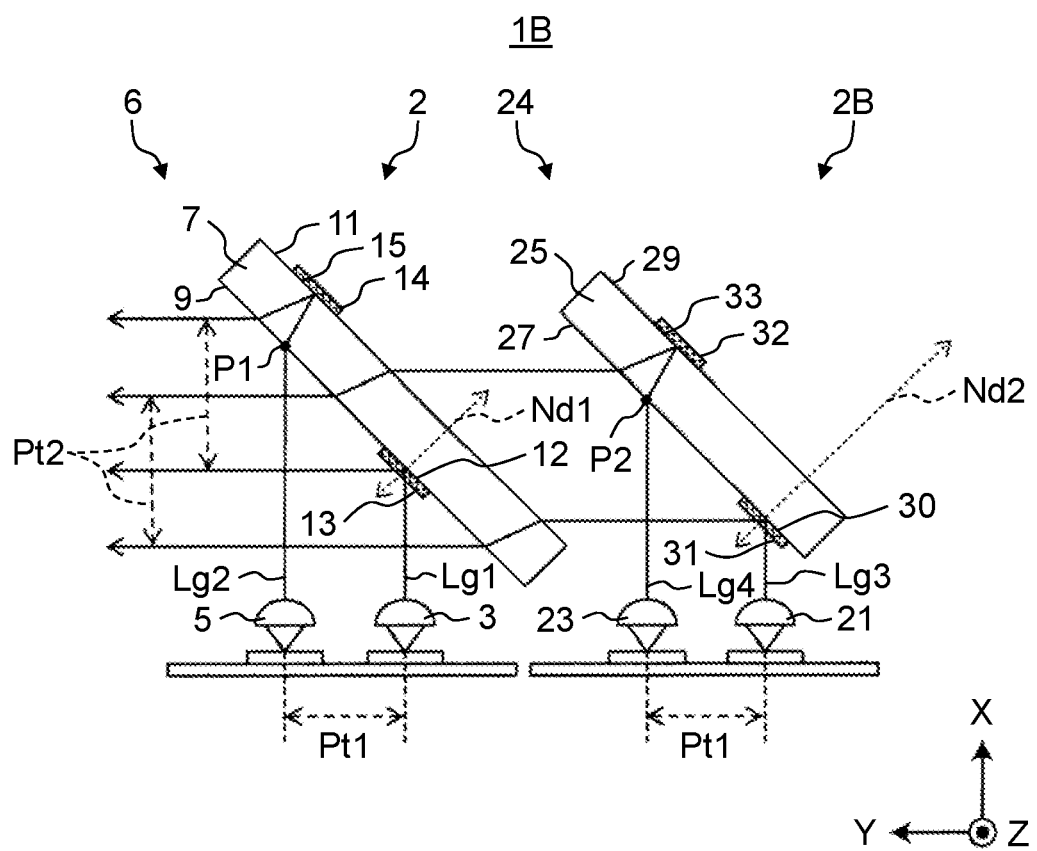
FIG. 3 is a schematic side view of a light source device according to a second exemplary embodiment of the present disclosure.
Figure 5:
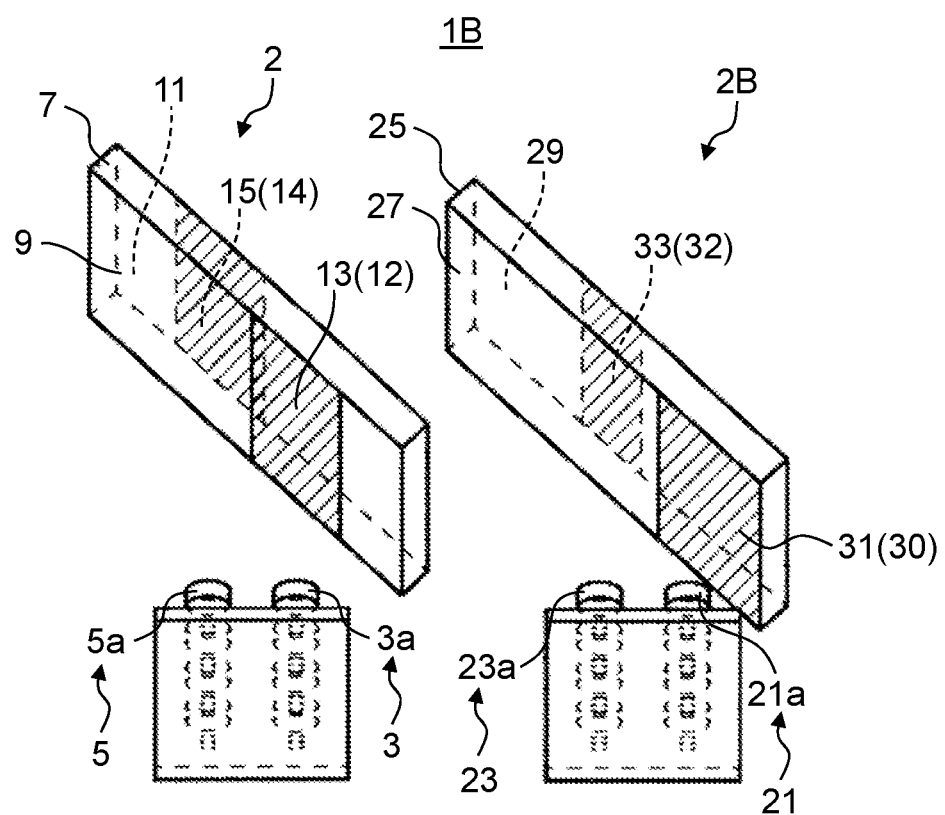
FIG. 5 is a schematic perspective view of the light source device as viewed from a light source.

A second exemplary embodiment will be described below with reference to FIGS. 3 to 5.
[2-1. Configuration]
FIG. 3 is a schematic side view of light source device 1B according to the second exemplary embodiment of the present disclosure. FIG. 4 is a schematic perspective view of light source device 1B according to the present disclosure as viewed from first reflection module 6 and second reflection module 24. FIG. 5 is a schematic perspective view of the light source device as viewed from light sources.

Light source device 1B according to the second exemplary embodiment has a configuration in which two light source modules 2 of light source device 1 according to the first exemplary embodiment are used. Light source device 1B according to the second exemplary embodiment and light source device 1 according to the first exemplary embodiment are the same except for the above point and points described below.

Similar to light source device 1, light source device 1B includes light source module 2, and further includes light source module 2B. Light source module 2B includes third light source 21, fourth light source 23, and second reflection module 24. Second reflection module 24 is disposed parallel to first reflection module 6.

Third light source 21 is, for example, a light source array having a plurality of solid-state light source elements 21a arranged in one direction (Z direction) and collimator lenses arranged corresponding to solid-state light source elements 21a. Solid-state light source elements 21a are, for example, semiconductor lasers. Optical axes of light beams emitted from respective solid-state light source elements 21a are parallel.

Fourth light source 23 is, for example, a light source array having a plurality of solid-state light source elements 23a arranged in one direction (Z direction) and collimator lenses arranged corresponding to solid-state light source elements 23a. Solid-state light source elements 23a are, for example, semiconductor lasers. Optical axes of light beams emitted from respective solid-state light source elements 23a are parallel. Further, optical axes of light beams Lg3 emitted from solid-state light source elements 21a of third light source 21 and optical axes of light beams Lg4 emitted from solid-state light source elements 23a of fourth light source 23 are also parallel.

Second reflection module 24 has second base member 25, third reflector 30, and fourth reflector 32. Second base member 25 is a light-transmissive rectangular plate member, and is, for example, a glass plate or a resin plate. Second base member 25 includes third main surface 27 that faces third light source 21 and fourth light source 23, and fourth main surface 29 that faces third main surface 27. Third main surface 27 and fourth main surface 29 are parallel to each other.

Third main surface 27 is provided with third reflector 30 having third reflective surface 31 that totally reflects light beam Lg3 from third light source 21. Third reflector 30 is located on the optical axis of light beam emitted from third light source 21. Fourth main surface 29 is provided with fourth reflector 32 having fourth reflective surface 33 that totally reflects light beam Lg4 from fourth light source 23. Third reflector 30 and fourth reflector 32 are, for example, metal films or dielectric multilayer films, and are formed by sputtering, vapor deposition, or the like. Third reflective surface 31 is parallel to first reflective surface 13.

Third reflective surface 31 and fourth reflective surface 33 have a rectangular shape extending in the Z direction along the solid-state light source arrays of third light source 21 and fourth light source 23.

Fourth reflective surface 33 is disposed at a position farther from third light source 21 and fourth light source 23 than third main surface 27 as a virtual plane including third reflective surface 31 along the optical axes (X-axis direction) of light beams Lg3 and Lg4 from third light source 21 and fourth light source 23 which are not yet reflected. Fourth reflective surface 33 is located in a space behind third reflective surface 31 with respect to normal direction Nd2 of third reflective surface 31.

Third reflective surface 31 is disposed such that light beam Lg3 from third light source 21 enters third reflective surface 31 at an incident angle of 45°. Therefore, light beam Lg3 reflected by third reflective surface 31 proceeds in a direction at an angle of 90° with respect to entering light beam Lg3.

Further, in second reflection module 24, light beam Lg4 from fourth light source 23 is refracted at intersection P2 with third main surface 27 as a virtual plane, and enters second base member 25. The entering light beam travels in second base member 25 and is totally reflected by fourth reflective surface 33 on fourth main surface 29. Totally reflected light beam Lg4 travels inside second base member 25, is refracted by third main surface 27, and is emitted from second base member 25. Therefore, the optical axis of light beam Lg4 that enters second reflection module 24 and the optical axis of light beam Lg4 that exits from second reflection module 24 are orthogonal to each other. At this time, the optical path is shifted in the X-axis direction until light beam Lg4 enters second reflection module 24, is reflected by fourth reflective surface 33, and exits from second reflection module 24. Therefore, pitch Pt2 between light beam Lg3 reflected by third reflective surface 31 and light beam Lg4 reflected by fourth reflective surface 33 and exiting from second reflection module 24 is longer than pitch Pt1 between third light source 21 and fourth light source 23. In the present exemplary embodiment, the pitch between first light source 3 and second light source 5 and the pitch between third light source 21 and fourth light source 23 are the same, but they may be different from each other.

Second main surface 11 of first reflection module 6 and third main surface 27 of second reflection module 24 face each other and are parallel to each other. Light beam Lg3 reflected by third reflective surface 31 enters into first reflection module 6 after being refracted by second main surface 11 of first reflection module 6, and exits from first reflection module 6 after being refracted by first main surface 9. Third reflector 30 is disposed such that light beam Lg3 emitted from first reflection module 6 is located closer to first light source 3 than light beam Lg1 reflected by first reflective surface 13 is.

Light beam Lg4 reflected by fourth reflective surface 33 and emitted from second reflection module 24 enters into first reflection module 6 after being refracted by second main surface 11 of first reflection module 6, and exits from first reflection module 6 after being refracted by first main surface 9. Fourth reflector 32 is disposed such that light beam Lg4 emitted from first reflection module 6 is located between light beam Lg1 reflected by first reflective surface 13 and light beam Lg2 reflected by second reflective surface 15. That is, as shown in FIG. 3, fourth reflector 32 is configured such that light beam Lg4 reflected by fourth reflective surface 33 passes between first reflector 12 and second reflector 14. Further, second reflection module 24 is configured such that light beam Lg3 reflected by third reflective surface 31 and light beam Lg4 reflected by fourth reflective surface 33 enter first base member 7. Furthermore, second reflection module 24 is configured such that light beam Lg4 entering first base member 7 passes between first reflector 12 and second reflector 14. In addition, first reflection module 6 is configured such that light beam Lg4 passing through first base member 7 is converted to be parallel to light beam Lg1 reflected by first reflective surface 13.

As described above, light source device 1B includes second reflection module 24 that reflects incident third light beam Lg3 and fourth light beam Lg4 as reflected light beams parallel to each other. Second reflection module 24 includes: third reflective surface 31 that reflects third light beam Lg3 from third light source 21; and fourth reflective surface 33 disposed in a direction away from intersection P2 (intersection between third main surface 27 as a virtual plane including third reflective surface 31 and the optical axis of fourth light beam Lg4 from fourth light source 23) along the optical path. Fourth reflective surface 33 reflects the light beam from fourth light source 23.

[2-2. Effects and Others]

As described above, light source device 1B according to the second exemplary embodiment includes, in addition to light source module 2, second reflection module 24 that includes: third reflector 30 having third reflective surface 31; fourth reflector 32 having fourth reflective surface 33 that is parallel to third reflective surface 31 and located in a space behind third reflective surface 31 with respect to normal direction Nd2 of third reflective surface 31; and light transmissive second base member 25. Light source device 1B also includes: third light source 21 that emits third light beam Lg3 directed to third reflective surface 31; and fourth light source 23 that emits fourth light beam Lg4 which is parallel to third light beam Lg3 and which is directed to fourth reflective surface 33 through a space in front of third reflective surface 31. Second base member 25 includes third main surface 27 on which third reflector 30 is disposed, and fourth main surface 29 which faces third main surface 27 and on which fourth reflector 32 is disposed. Third reflective surface 31 and fourth reflective surface 33 are disposed on second reflection module 24 such that third light beam Lg3 and fourth light beam Lg4 reflected by third reflective surface 31 and fourth reflective surface 33, respectively, do not enter first reflective surface 13 and second reflective surface 15 of first reflection module 6. That is, third reflector 30 is disposed on second base member 25 such that light beam Lg3 reflected by third reflective surface 31 enters neither first reflective surface 13 nor second reflective surface 15. Further, fourth reflector 32 is disposed on second base member 25 such that light beam Lg4 reflected by fourth reflective surface 33 enters neither first reflective surface 13 nor second reflective surface 15.

In light source module 2, second reflective surface 15 is disposed so as to be parallel to first reflective surface 13 and located in the space behind first reflective surface 13 with respect to normal direction Nd1 of first reflective surface 13. Thus, the pitch between light beam Lg1 from first light source 3 reflected by first reflective surface 13 and light beam Lg2 from second light source 5 reflected by second reflective surface 15 is increased. Further, also in light source module 2B, fourth reflective surface 33 is disposed so as to be parallel to third reflective surface 31 and located in the space behind third reflective surface 31 with respect to normal direction Nd2 of third reflective surface 31. Thus, the pitch between light beam Lg3 from third light source 21 reflected by third reflective surface 31 and light beam Lg4 from fourth light source 23 reflected by fourth reflective surface 33 is increased.

Light beam Lg4 reflected by fourth reflective surface 33 is spatially combined between light beam Lg1 reflected by first reflective surface 13 and light beam Lg2 reflected by second reflective surface 15 which have an increased pitch, and thus, an occurrence of loss due to reflection of light beam Lg4 on first reflective surface 13 and second reflective surface 15 can be prevented. Further, light beam Lg3 reflected by third reflective surface 31 also enters first reflection module 6 and is spatially combined on the side closer to first light source 3 than first reflective surface 13 is, and thus, an occurrence of loss caused by reflection on first reflective surface 13 can be prevented.

Figure 6:
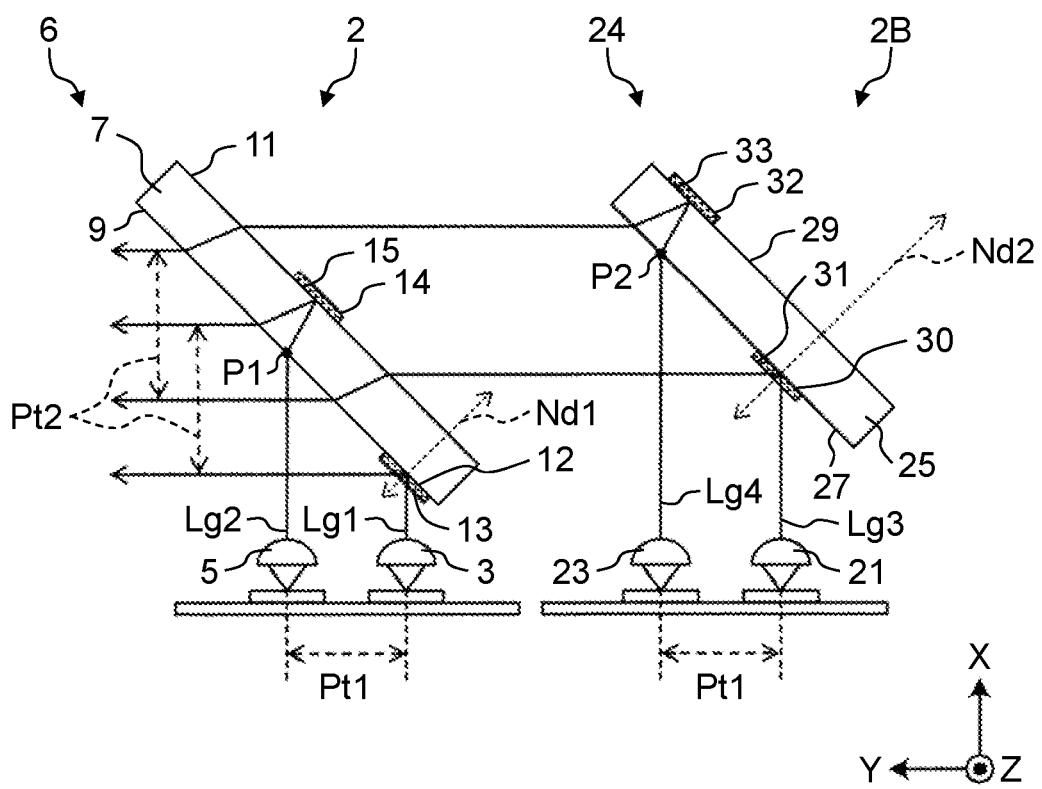
FIG. 6 is a schematic side view of a light source device according to a modification of the second exemplary embodiment of the present disclosure.

Next, a modification of the second exemplary embodiment will be described with reference to FIG. 6. Light source device 1C according to the modification of the second exemplary embodiment is different from light source device 1B according to the second exemplary embodiment in an incident position of the reflected light from light source module 2B to light source module 2. Third reflector 30 is disposed on third main surface 27 such that light beam Lg3 emitted from first reflection module 6 is located between light beam Lg1 reflected by first reflective surface 13 and light beam Lg2 reflected by second reflective surface 15. Further, fourth reflector 32 is disposed on fourth main surface 29 such that light beam Lg4 emitted from first reflection module 6 is located on the side opposite to second light source 5 with respect to light beam Lg2 reflected by second reflective surface 15.

In light source device 1C, light beam Lg3 reflected by third reflective surface 31 is spatially combined between light beam Lg1 reflected by first reflective surface 13 and light beam Lg2 reflected by second reflective surface 15 which have an increased pitch, and thus, an occurrence of loss due to reflection of light beam Lg3 on first reflective surface 13 and second reflective surface 15 can be prevented. Further, light beam Lg4 reflected by fourth reflective surface 33 also enters first reflection module 6 and is spatially combined with light beam Lg1 and light beam Lg2 on the side opposite to second light source 5 with respect to second reflective surface 15, and thus, an occurrence of loss caused by reflection of light beam Lg4 on second reflective surface 15 can be prevented.

Third Exemplary Embodiment

A third exemplary embodiment will be described below with reference to FIG. 7.

[3-1. Configuration]

Figure 7:
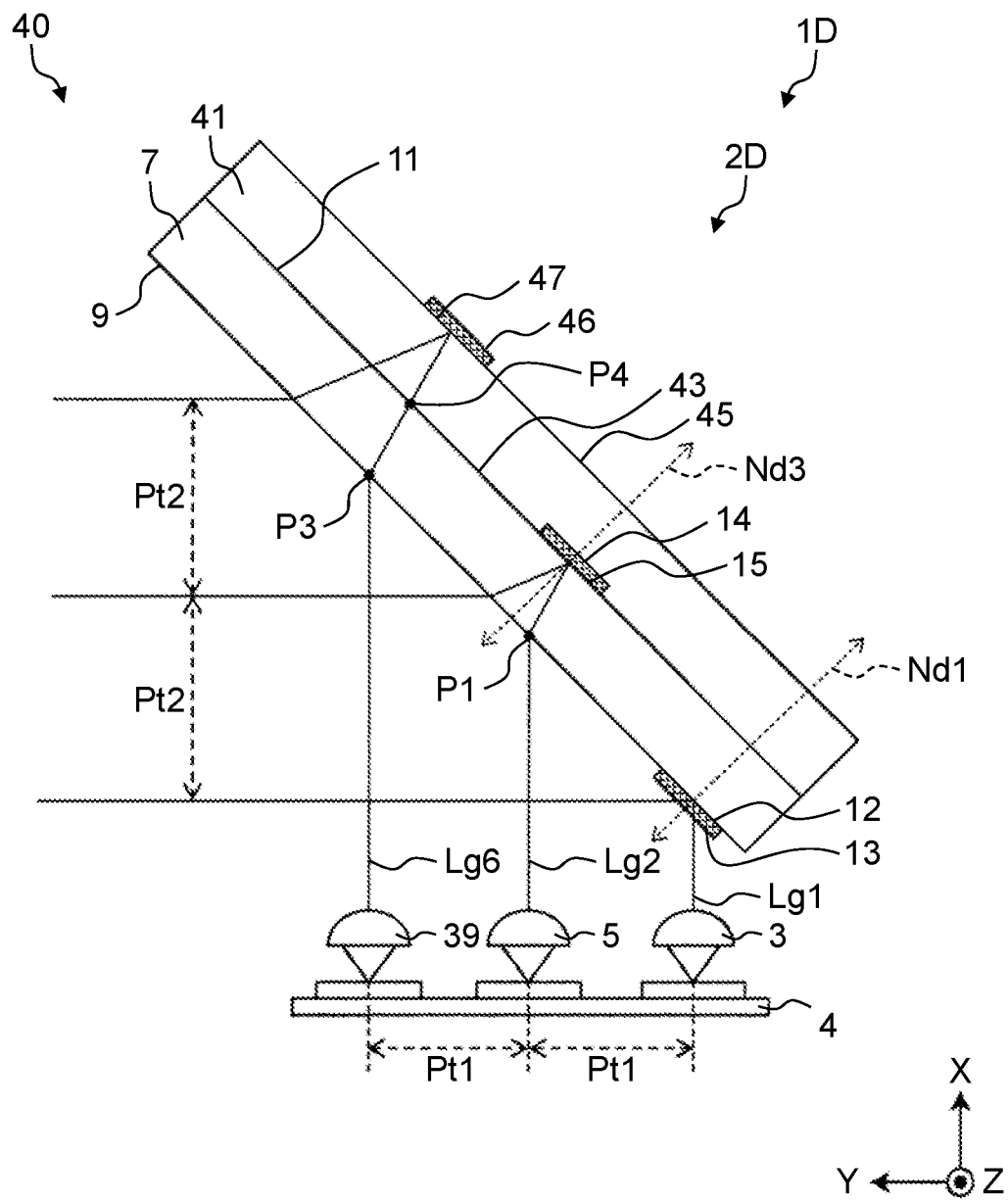
FIG. 7 is a schematic side view of a light source device according to a third exemplary embodiment of the present disclosure.

FIG. 7 is a schematic side view of light source device 1D according to the third exemplary embodiment of the present disclosure. Light source device 1D according to the third exemplary embodiment has a configuration in which a light source and a base member having a reflector are added to light source module 2 of light source device 1 according to the first exemplary embodiment. Light source device 1D according to the third exemplary embodiment and light source device 1 according to the first exemplary embodiment are the same except for the above point and points described below.

Light source device 1D includes light source module 2D. Light source module 2D includes first light source 3, second light source 5, third light source 39, and first reflection module 40. Light source device 1D may include substrate 4 on which first light source 3, second light source 5, and third light source 39 are disposed.

Third light source 39 is, for example, a light source array having a plurality of solid-state light source elements arranged in one direction (Z direction) and collimator lenses arranged corresponding to the solid-state light source elements. The solid-state light source elements are, for example, semiconductor lasers. Optical axes of light beams emitted from the respective solid-state light source elements are parallel.

First reflection module 40 has a configuration in which second base member 41 is added to first reflection module 6 in the first exemplary embodiment so as to be in contact with second main surface 11. Second base member 41 includes third main surface 43 that is in contact with first base member 7, and fourth main surface 45 that faces third main surface 43. Second base member 41 has a rectangular plate shape. Fourth main surface 45 is provided with third reflector 46 having third reflective surface 47 that totally reflects light beam Lg6 from third light source 39. Third main surface 43 and fourth main surface 45 are parallel to each other. Third reflector 46 is, for example, a metal film or a dielectric multilayer film, and is formed by sputtering, vapor deposition, or the like.

First base member 7 and second base member 41 are made of materials having the same refractive index. Second main surface 11 of first base member 7 and third main surface 43 of second base member 41 are in contact with each other. Second reflector 14 formed on second main surface 11 of first base member 7 may be formed on third main surface 43 of second base member 41.

In light source module 2D, second reflective surface 15 is disposed in a direction away from intersection P1 between first main surface 9 including first reflective surface 13 and light beam Lg2 from second light source 5 along the optical path. Thus, the pitch between light beam Lg1 from first light source 3 reflected by first reflective surface 13 and light beam Lg2 from second light source 5 reflected by second reflective surface 15 is increased. Further, third reflective surface 47 is disposed in a direction away from intersection P3 between first main surface 9 including first reflective surface 13 and light beam Lg6 from third light source 39 along the optical path. Further, third reflective surface 47 is disposed in a direction away from intersection P4 between second main surface 11 including second reflective surface 15 and light beam Lg6 from third light source 39 along the optical path. Thus, the pitch between light beam Lg2 from second light source 5 reflected by second reflective surface 15 and light beam Lg6 from third light source 39 reflected by third reflective surface 47 is increased.

As described above, light source device 1D includes third light source 39 that emits third light beam Lg6 having an optical axis parallel to the optical axis of first light beam Lg1 and the optical axis of second light beam Lg2. First reflection module 40 reflects incident first light beam Lg1, second light beam Lg2, and third light beam Lg6 in the vertical direction as reflected light beams parallel to each other. Second base member 41 has third reflective surface 47 that reflects third light beam Lg6 from third light source 39. Third reflective surface 47 is disposed in a direction away from intersection P4 between second main surface 11 serving as a virtual plane and including second reflective surface 15 and the optical axis of third light beam Lg6 from third light source 39 along the optical path.

[3-2. Effects and Others]

As described above, light source device 1D according to the third exemplary embodiment includes first reflection module 40. First reflection module 40 includes: third reflector 46 having third reflective surface 47 that is parallel to first reflective surface 13 and second reflective surface 15 and is located in a space behind second reflective surface 15 with respect to normal direction Nd3 of second reflective surface 15; first reflector 12; and second reflector 14. Light source device 1D also includes third light source 39 that emits third light beam Lg6 parallel to first light beam Lg1 and second light beam Lg2 and directed to third reflective surface 47 through a space in front of first reflective surface 13 and second reflective surface 15. First reflection module 40 reflects incident first light beam Lg1, second light beam Lg2, and third light beam Lg6 as reflected light beams parallel to each other.

In the third exemplary embodiment, second reflective surface 15 is parallel to first reflective surface 13, and is located in the space behind first reflective surface 13 with respect to normal direction Nd1 of first reflective surface 13. Further, third reflective surface 47 is parallel to first reflective surface 13 and second reflective surface 15, and is located in the space behind second reflective surface 15 with respect to normal direction Nd3 of second reflective surface 15. Accordingly, the pitch between light beam Lg1 from first light source 3 reflected by first reflective surface 13 and light beam Lg2 from second light source 5 reflected by second reflective surface 15 is increased, and the pitch between light beam Lg2 from second light source 5 reflected by second reflective surface 15 and light beam Lg6 from third light source 39 reflected by third reflective surface 47 is increased. As a result, light source device 1D having light rays with a pitch greater than the pitch between solid-state light sources can be provided.

Note that, as in the modification of the first exemplary embodiment, another light source may be disposed so as to face fourth main surface 45 of second base member 41. The light beam emitted from the light source enters into first reflection module 40 after being refracted by fourth main surface 45 of second base member 41, is refracted by first main surface 9, and exits from first reflection module 40. The light source is disposed such that the light beam emitted from first reflection module 40 is located between light beam Lg1 reflected by first reflective surface 13 and light beam Lg2 reflected by second reflective surface 15, or between light beam Lg2 reflected by second reflective surface 15 and light beam Lg6 reflected by third reflective surface 47.

In this case, the pitch between light beam Lg1 and light beam Lg2 and the pitch between light beam Lg2 and light beam Lg6 are increased, and thus, the respective light beams are easily spatially combined, and loss of each light beam due to reflection on first reflective surface 13, second reflective surface 15, or third reflective surface 47 can be prevented.

In addition, a number of light sources may be increased in the Y-axis direction. In that case, it is only required that, each time a number of rows of the light sources is increased by one, a base member on which a reflector that reflects a light beam from the increased light source is disposed is stacked on second base member 41.

Fourth Exemplary Embodiment

A fourth exemplary embodiment will be described below with reference to FIG. 8.

[4-1. Configuration]

Figure 8:
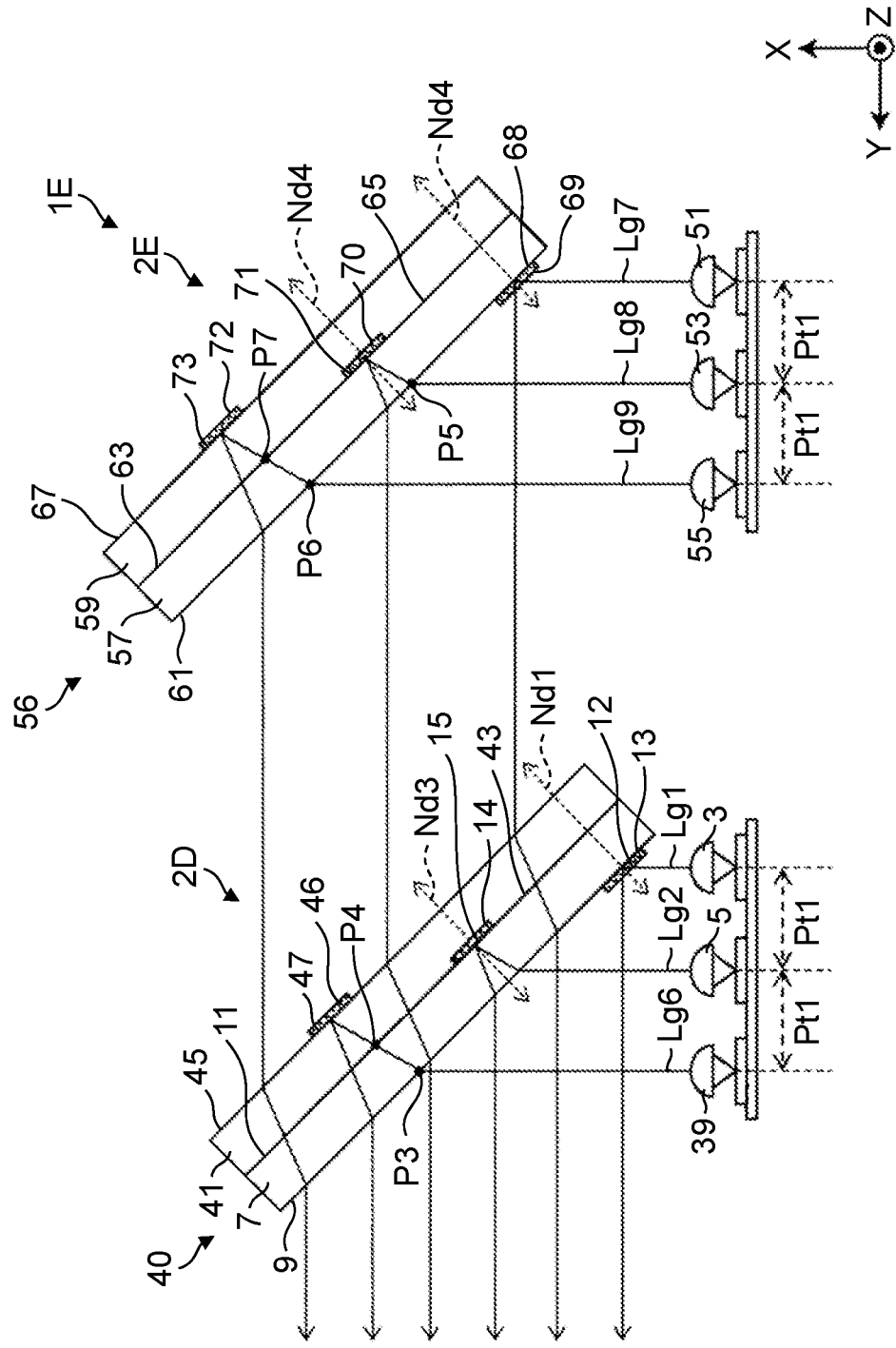
FIG. 8 is a schematic side view of a light source device according to a fourth exemplary embodiment of the present disclosure.

FIG. 8 is a schematic side view of light source device 1E according to the fourth exemplary embodiment of the present disclosure.

Light source device 1E according to the fourth exemplary embodiment has a configuration in which two light source modules 2D of light source device 1D according to the third exemplary embodiment are used. Light source device 1E according to the fourth exemplary embodiment and light source device 1D according to the third exemplary embodiment are the same except for the above point and points described below.

Similar to light source device 1D, light source device 1E includes light source module 2D, and further includes light source module 2E. Light source module 2E includes fourth light source 51, fifth light source 53, sixth light source 55, and second reflection module 56. Second reflection module 56 is disposed parallel to first reflection module 40.

Each of fourth light source 51, fifth light source 53, and sixth light source 55 is, for example, a light source array having a plurality of solid-state light source elements arranged in one direction (Z direction) and collimator lenses arranged corresponding to the solid-state light source elements. Optical axes of light beams emitted from the respective solid-state light source elements are parallel.

Second reflection module 56 has the same configuration as first reflection module 40 in the fourth exemplary embodiment. Second reflection module 56 has third base member 57, fourth base member 59, fourth reflector 68, fifth reflector 70, and sixth reflector 72. Third base member 57 includes fifth main surface 61 that faces fourth to sixth light sources 51 to 55, and sixth main surface 63 that faces fifth main surface 61. Fifth main surface 61 and sixth main surface 63 are parallel to each other. Fifth main surface 61 is provided with fourth reflector 68 having fourth reflective surface 69 that totally reflects light beam Lg7 from fourth light source 51. Fourth reflector 68 is located on the optical axis of light beam emitted from fourth light source 51. Sixth main surface 63 is provided with fifth reflector 70 having fifth reflective surface 71 that totally reflects light beam Lg5 from fifth light source 53. Fourth reflective surface 69 and fifth reflective surface 71 have a rectangular shape extending in the Z direction along the solid-state light source arrays of fourth light source 51 and fifth light source 53. Fourth base member 59 includes seventh main surface 65 that is in contact with third base member 57, and eighth main surface 67 that faces seventh main surface 65. Third base member 57 and fourth base member 59 have a rectangular plate shape, and are, for example, glass plates or resin plates. Eighth main surface 67 is provided with sixth reflector 72 having sixth reflective surface 73 that totally reflects light beam Lg9 from sixth light source 55. Seventh main surface 65 and eighth main surface 67 are parallel to each other. Each of fourth reflector 68, fifth reflector 70, and sixth reflector 72 is, for example, a metal film or a dielectric multilayer film, and is formed by sputtering, vapor deposition, or the like.

Third base member 57 and fourth base member 59 are made of materials having the same refractive index. Sixth main surface 63 of third base member 57 and seventh main surface 65 of fourth base member 59 are in contact with each other. Fifth reflector 70 formed on sixth main surface 63 of third base member 57 may be formed on seventh main surface 65 of fourth base member 59.

In the fourth exemplary embodiment, fifth reflective surface 71 is disposed in a direction away from intersection P5 between fifth main surface 61 including fourth reflective surface 69 and light beam Lg8 from fifth light source 53 along the optical path. Thus, the pitch between light beam Lg7 from fourth light source 51 reflected by fourth reflective surface 69 and light beam Lg8 from fifth light source 53 reflected by fifth reflective surface 71 is increased.

Further, sixth reflective surface 73 is disposed in a direction away from intersection P6 between fifth main surface 61 including fourth reflective surface 69 and light beam Lg9 from sixth light source 55 along the optical path. Further, sixth reflective surface 73 is disposed in a direction away from intersection P7 between sixth main surface 63 including fifth reflective surface 71 and light beam Lg9 from sixth light source 55 along the optical path. Thus, the pitch between light beam Lg8 from fifth light source 53 reflected by fifth reflective surface 71 and light beam Lg9 from sixth light source 55 reflected by sixth reflective surface 73 is increased.

[4-2. Effects and Others]

As described above, light source device 1E according to the fourth exemplary embodiment includes second reflection module 56 in addition to light source module 2D. Second reflection module 56 includes: fourth reflector 68 having fourth reflective surface 69; fifth reflector 70 having fifth reflective surface 71 that is parallel to fourth reflective surface 69 and is located in a space behind fourth reflective surface 69 with respect to normal direction Nd4 of fourth reflective surface 69; and sixth reflector 72 having sixth reflective surface 73 that is parallel to fourth reflective surface 69 and fifth reflective surface 71 and is located in a space behind fifth reflective surface 71 with respect to normal direction Nd4 of fifth reflective surface 71. Light source device 1E further includes: fourth light source 51 that emits fourth light beam Lg7 directed to fourth reflective surface 69; fifth light source 53 that emits fifth light beam Lg8 which is parallel to fourth light beam Lg7 and which is directed to fifth reflective surface 71 through a space in front of fourth reflective surface 69; and sixth light source 55 that emits sixth light beam Lg9 which is parallel to fourth light beam Lg7 and fifth light beam Lg8 and which is directed to sixth reflective surface 73 through a space in front of fourth reflective surface 69 and fifth reflective surface 71. Second reflection module 56 reflects incident fourth light beam Lg7, fifth light beam Lg8, and sixth light beam Lg9 as reflected light beams parallel to each other.

As a result, the pitch between first light beam Lg1 and second light beam Lg2 and the pitch between second light beam Lg2 and third light beam Lg6 are increased by first reflection module 40. Further, the pitch between fourth light beam Lg7 and fifth light beam Lg8 and the pitch between fifth light beam Lg8 and sixth light beam Lg9 are increased by second reflection module 56. Therefore, it is easy to spatially combine first light beam Lg1, second light beam Lg2, and third light beam Lg6 with fourth light beam Lg7, fifth light beam Lg8, and sixth light beam Lg9.

Further, light beam Lg7 reflected by fourth reflective surface 69 is spatially combined between light beam Lg1 reflected by first reflective surface 13 and light beam Lg2 reflected by second reflective surface 15 which have an increased pitch, and thus, an occurrence of loss due to reflection of light beam Lg7 on first reflective surface 13 and second reflective surface 15 can be prevented. Further, light beam Lg8 reflected by fifth reflective surface 71 is spatially combined between light beam Lg2 reflected by second reflective surface 15 and light beam Lg6 reflected by third reflective surface 47, and thus, an occurrence of loss due to reflection of light beam Lg8 on second reflective surface 15 and third reflective surface 47 can be prevented. Further, light beam Lg9 reflected by sixth reflective surface 73 also enters second base member 41 on the side opposite to third light source 39 with respect to third reflective surface 47, and is spatially combined, and thus, an occurrence of a loss due to reflection on third reflective surface 47 can be prevented.

Fifth Exemplary Embodiment

Figure 9:
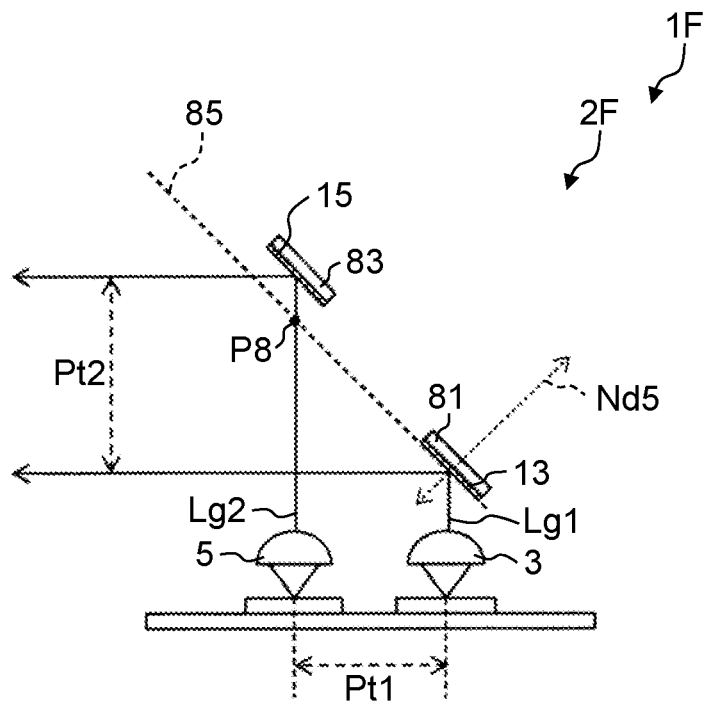
FIG. 9 is a schematic side view of a light source device according to a fifth exemplary embodiment of the present disclosure.

A fifth exemplary embodiment will be described below with reference to FIG. 9.
[5-1. Configuration]
FIG. 9 is a schematic side view of light source device 1F according to the fifth exemplary embodiment of the present disclosure.

Light source device 1F according to the fifth exemplary embodiment has a configuration in which first reflection module 6 in light source device 1 according to the first exemplary embodiment is divided, and first reflective surface 13 and second reflective surface 15 are included in different mirrors. Light source device 1F according to the fifth exemplary embodiment and light source device 1 according to the first exemplary embodiment are the same except for the above point and points described below.

Light source device 1F includes light source module 2F. Light source module 2F includes first light source 3, second light source 5, first mirror 81, and second mirror 83.

First reflective surface 13 is formed on a side of first mirror 81 facing first light source 3. Second reflective surface 15 is formed on a side of second mirror 83 facing second light source 5. The size of the base area of first mirror 81 is substantially equal to the size of first reflective surface 13. The size of the base area of second mirror 83 is also substantially equal to the size of second reflective surface 15. First mirror 81 and second mirror 83 are disposed parallel to each other. Second mirror 83 is disposed in a direction away from intersection P8 between virtual plane 85 including first reflective surface 13 and light beam Lg2 from second light source 5 along the optical path. Second reflective surface 15 is parallel to first reflective surface 13 and is located in a space behind first reflective surface 13 with respect to normal direction Nd5 of first reflective surface 13.
[5-2. Effects and Others]
As described above, light source device 1F according to the fifth exemplary embodiment includes: first mirror 81 having first reflective surface 13; second mirror 83 having second reflective surface 15 that is parallel to first reflective surface 13 and is located in a space behind first reflective surface 13 with respect to normal direction Nd5 of first reflective surface 13; first light source 3 that emits first light beam Lg1 directed to first reflective surface 13; and second light source 5 that emits second light beam Lg2 which is parallel to first light beam Lg1 and which is directed to second reflective surface 15 through a space in front of first reflective surface 13.

In the fifth exemplary embodiment, second mirror 83 has second reflective surface 15 that is parallel to first reflective surface 13 and is located in the space behind first reflective surface 13 with respect to normal direction Nd5 of first reflective surface 13. Thus, the pitch between light beam Lg1 from first light source 3 reflected by first reflective surface 13 and light beam Lg2 from second light source 5 reflected by second reflective surface 15 is increased. As a result, light source device 1F having light rays with a pitch greater than the pitch between light sources can be provided. Light source module 2F may include: a reflector having a reflective surface that is parallel to first reflective surface 81 and second reflective surface 83 and is located in a space behind second reflective surface 83 with respect to a normal direction of second reflective surface 83; and a light source that emits a light beam directed to the reflector.

Sixth Exemplary Embodiment

Figure 10:
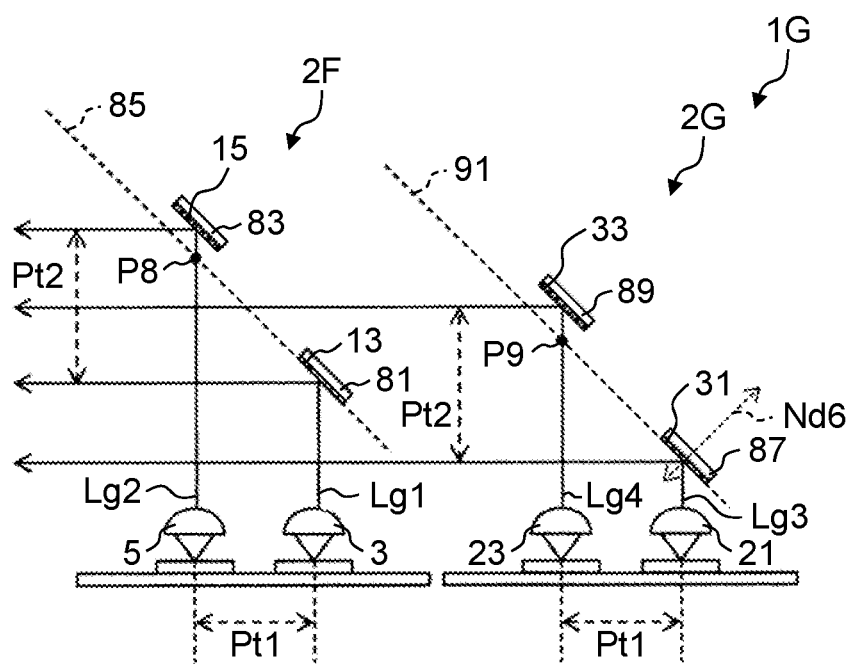
FIG. 10 is a schematic side view of a light source device according to a sixth exemplary embodiment of the present disclosure.

A sixth exemplary embodiment will be described below with reference to FIG. 10.
[6-1. Configuration]
FIG. 10 is a schematic side view of light source device 1G according to the sixth exemplary embodiment of the present disclosure.

Light source device 1G according to the sixth exemplary embodiment uses two light source modules 2F of light source device 1F according to the fifth exemplary embodiment, and is configured to spatially combine light beams emitted from the light source modules. Light source device 1G according to the sixth exemplary embodiment and light source device 1F according to the fifth exemplary embodiment are the same except for the above point and points described below.

Light source device 1G includes light source module 2F and light source module 2G. Light source module 2G includes third light source 21, fourth light source 23, third mirror 87, and fourth mirror 89.

Third reflective surface 31 is formed on a side of third mirror 87 facing third light source 21. Fourth reflective surface 33 is formed on a side of fourth mirror 89 facing fourth light source 23. The size of the base area of third mirror 87 is substantially equal to the size of third reflective surface 31. The size of the base area of fourth mirror 89 is also substantially equal to the size of fourth reflective surface 33. Third mirror 87 and fourth mirror 89 are disposed in parallel with each other. Fourth mirror 89 is disposed in a direction away from intersection P9 between virtual plane 91 including third reflective surface 31 and light beam Lg4 from fourth light source 23 along the optical path. Fourth reflective surface 33 is parallel to third reflective surface 31, and is located in a space behind third reflective surface 31 with respect to normal direction Nd6 of third reflective surface 31.
[6-2. Effects and Others]
As described above, light source device 1G according to the sixth exemplary embodiment includes light source module 2G in addition to light source module 2F. Light source module 2G includes: third mirror 87 having third reflective surface 31; fourth mirror 89 having fourth reflective surface 33 that is parallel to third reflective surface 31 and is located in a space behind third reflective surface 31 with respect to normal direction Nd6 of third reflective surface 31; third light source 21 that emits third light beam Lg3 directed to third reflective surface 31; and fourth light source 23 that emits fourth light beam Lg4 which is parallel to third light beam Lg3 and which is directed to fourth reflective surface 33 through a space in front of third reflective surface 31.

In the sixth exemplary embodiment, fourth reflective surface 33 is parallel to third reflective surface 31, and is located in the space behind third reflective surface 31 with respect to normal direction Nd6 of third reflective surface 31. Thus, the pitch between light beam Lg3 from third light source 21 reflected by third reflective surface 31 and light beam Lg4 from fourth light source 23 reflected by fourth reflective surface 33 is increased. In addition, the pitch between light beam Lg1 from first light source 3 reflected by first reflective surface 13 and light beam Lg2 from second light source 5 reflected by second reflective surface 15 is also increased. As a result, it becomes easy to spatially combine the light beam of light source module 2F and the light beam of light source module 2G. Light source module 2F may include: a reflector having a reflective surface that is parallel to first reflective surface 81 and second reflective surface 83 and is located in a space behind second reflective surface 83 with respect to a normal direction of second reflective surface 83; and a light source that emits a light beam directed to the reflector. Further, light source module 2G may include: a reflector having a reflective surface that is parallel to third reflective surface 87 and fourth reflective surface 89 and is located in a space behind fourth reflective surface 89 with respect to a normal direction of fourth reflective surface 89; and a light source that emits a light beam directed to the reflector.

Seventh Exemplary Embodiment

A seventh exemplary embodiment will be described below with reference to FIG. 11.

Figure 11:
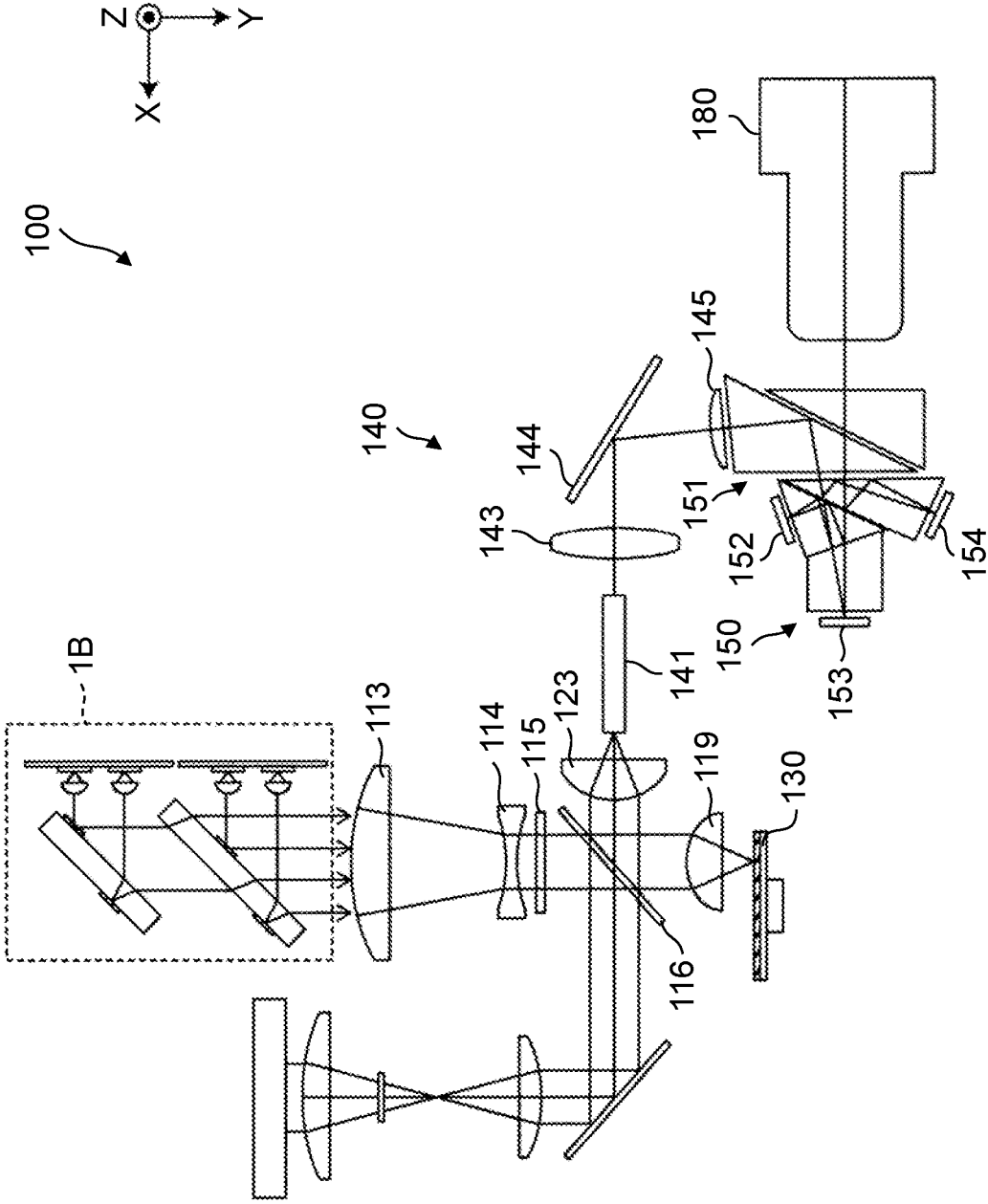
FIG. 11 is a schematic diagram for describing a projection image display device according to a seventh exemplary embodiment of the present disclosure.

FIG. 11 is a schematic diagram for describing a projection image display device according to the seventh exemplary embodiment of the present disclosure.

Projection image display device 100 according to the seventh exemplary embodiment includes, for example, light source device 1B according to the second exemplary embodiment, light modulator 150 that modulates light incident from light source device 1B on the basis of an external signal, and projection lens unit 180 for magnifying and projecting the light modulated by light modulator 150. Projection image display device 100 may use any of light source devices 1 to 1G instead of light source device 1B. Projection image display device 100 is a so-called digital light processing (DLP (registered trademark)) projector. Projection image display device 100 may further include lenses 113 and 114, diffusion plate 115, dichroic mirror 116, lens 119, phosphor wheel device 130, condenser lens 123, and light guide section 140.

The entire light flux of collimated light emitted from light source device 1B is converged by lens 113, and is again substantially collimated by lens 114. The laser light flux that has been substantially collimated by lens 114 passes through diffusion plate 115 and enters dichroic mirror 116.

A portion of light entering dichroic mirror 116 is condensed by lens 119, excites a phosphor formed on phosphor wheel device 130, and emits yellow light. The yellow light is collimated by lens 119, is combined with blue light by dichroic mirror 116, is emitted as white light, is condensed by condenser lens 123, and enters light guide section 140.

Light guide section 140 includes rod integrator 141, lens 143, mirror 144, and lens 145. The light emitted from condenser lens 123 enters light modulator 150 through rod integrator 141, lens 143, mirror 144, and lens 145.

Light modulator 150 includes prism 151 and light modulation elements 152, 153, and 154. Prism 151 separates the incident white light into three colors of blue, green, and red, and also combines the three colors of light from light modulation elements 152, 153, and 154 and outputs the combined light to projection lens unit 180 as image light.

Light modulation elements 152, 153, and 154 are, for example, digital micromirror devices (DMD). The red light separated by prism 151 enters light modulation element 152, the green light enters light modulation element 153, and the blue light enters light modulation element 154. When these pieces of light are reflected by respective light modulation elements 152, 153, and 154, they are modulated on the basis of an external signal. The pieces of modulated light of the respective colors are combined again by prism 151 and emitted.

Projection lens unit 180 magnifies image light emitted from light modulator 150 and projects the emitted image light on a screen, for example.

Eighth Exemplary Embodiment

An eighth exemplary embodiment will be described below with reference to FIG. 12.

Figure 12:
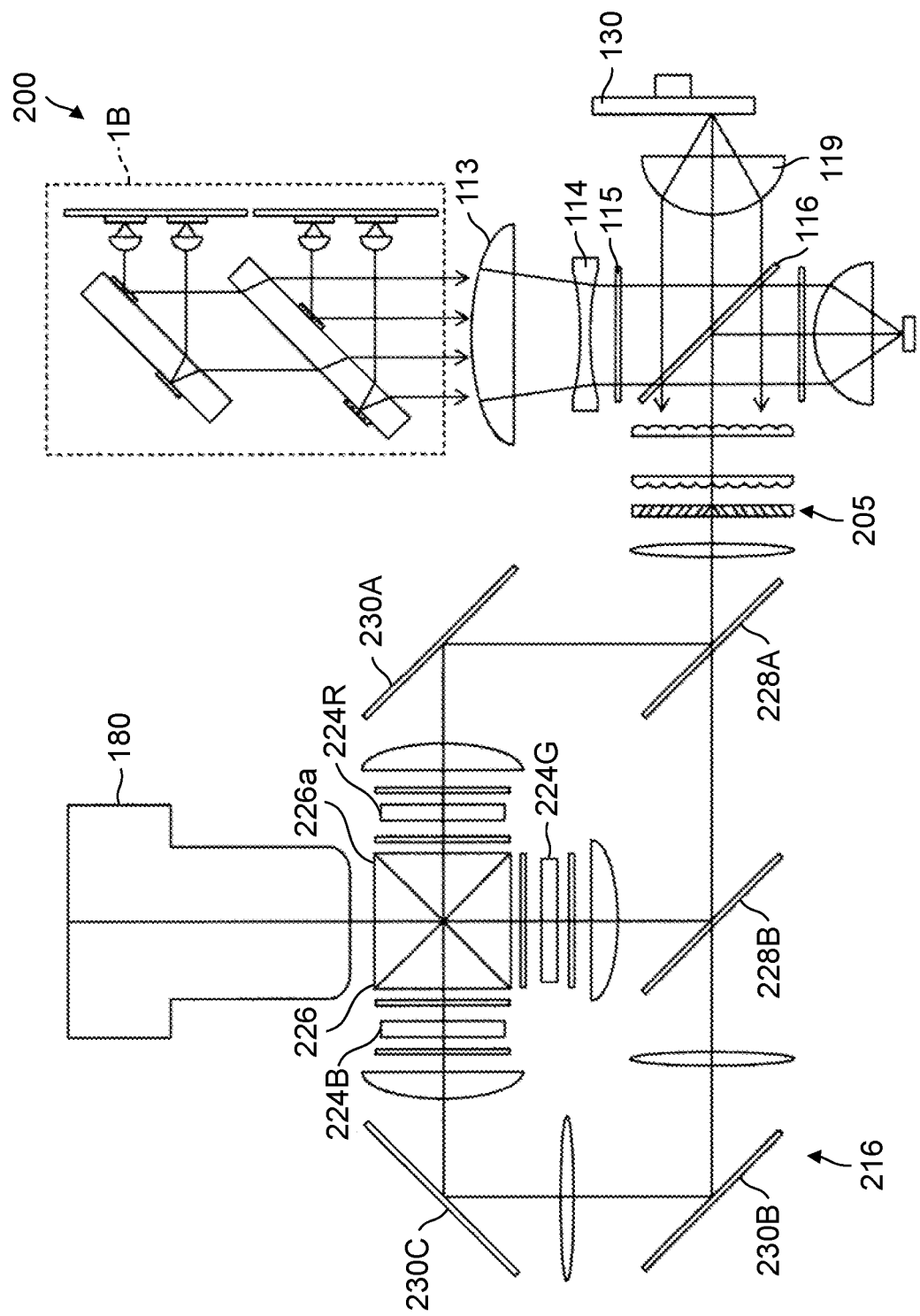
FIG. 12 is a schematic diagram for describing a projection image display device according to an eighth exemplary embodiment of the present disclosure.

FIG. 12 is a schematic diagram for describing a projection image display device according to the eighth exemplary embodiment of the present disclosure.

Projection image display device 200 according to the eighth exemplary embodiment includes, for example, light source device 1B according to the second exemplary embodiment. Note that projection image display device 200 may use any of light source devices 1 to 1G instead of light source device 1B. Projection image display device 200 according to the eighth exemplary embodiment is not a DLP projector but a 3LCD (liquid crystal display) projector.

3LCD projection image display device 200 includes light source device 1B, light guide section 205, image former 216, and projection lens unit 180. Projection image display device 200 may further include lenses 113 and 114, diffusion plate 115, dichroic mirror 116, lens 119, and phosphor wheel device 130. Collimated light emitted from light source device 1B becomes white light and is emitted to light guide section 205, as in the seventh exemplary embodiment. White light entering light guide section 205 is guided to image former 216.

The light emitted from light guide section 205 is split into three pieces of light by dichroic mirrors 228A and 228B. The light reflected by dichroic mirror 228A is reflected by mirror 230A and passes through liquid crystal panel 224R for red light. The light passing through dichroic mirror 228A and reflected by dichroic mirror 228B passes through liquid crystal panel 224G for green light. The light passing through dichroic mirror 228B is reflected by mirror 230B and mirror 230C, and passes through liquid crystal panel 224B for blue light. The red light, green light, and blue light (image light) that have passed through three liquid crystal panels 224R, 224G, and 224B and are modulated on the basis of an external signal are combined in prism 226. The combined light (image light) is emitted from emission surface 226a of prism 226 toward projection lens unit 180.

Other Exemplary Embodiments

The above exemplary embodiments have been described above as an example of the technique disclosed in the present application. However, the technique in the present disclosure is not limited thereto, and can also be applied to exemplary embodiments subjected to modification, substitution, addition, omission, and the like. In addition, new exemplary embodiments can be made by combining constituents described in the above exemplary embodiments.

The exemplary embodiments have been described herein as an example of the technique in the present disclosure. The accompanying drawings and the detailed description have been provided for this purpose. Accordingly, the components described in the accompanying drawings and the detailed description may not only include components that are essential for solving the problems, but may also include components that are not essential for solving the problems in order to illustrate the technique. It should not be therefore determined that the unessential components in the accompanying drawings and the detailed description are essential only based on the fact that these components are included in the drawings and the description.

The above exemplary embodiments are provided to exemplify the technique according to the present disclosure, and thus various changes, replacements, additions, omissions, and the like can be made within the scope of the claims and equivalents thereof.

Summary of Exemplary Embodiments (1) The light source device according to the present disclosure includes: a first reflector having a first reflective surface; a second reflector having a second reflective surface that is parallel to the first reflective surface and is located behind the first reflective surface with respect to a normal direction of the first reflective surface; a first light source that emits a first light beam directed to the first reflective surface; and a second light source that emits a second light beam parallel to the first light beam, the second light beam passing in front of the first reflective surface and being directed to the second reflective surface.

Since the second reflective surface is located behind the first reflective surface with respect to the normal direction of the first reflective surface as described above, a pitch between the light beam from the first light source reflected by the first reflective surface and the light beam from the second light source reflected by the second reflective surface is increased. As a result, the light source device having light rays with a pitch greater than a pitch between the light sources can be provided.

(2) In the light source device according to (1), the first light source is a light source array having a plurality of solid-state light sources arranged in a first direction, and the second light source is a light source array having a plurality of solid-state light sources arranged in parallel with the first direction.

(3) The light source device according to (1) or (2) includes a first reflection module having a light-transmissive first base member, the first base member including a first main surface provided with the first reflector, and a second main surface that faces the first main surface and is provided with the second reflector.

(4) The light source device according to (1) or (2) includes: a third reflector having a third reflective surface; a fourth reflector having a fourth reflective surface that is parallel to the third reflective surface and is located behind the third reflective surface with respect to a normal direction of the third reflective surface; a third light source that emits a third light beam directed to the third reflective surface; and a fourth light source that emits a fourth light beam parallel to the third light beam, the fourth light beam passing in front of the third reflective surface and being directed to the fourth reflective surface.

(5) The light source device according to (3) includes: a second reflection module provided with a third reflector having a third reflective surface, a fourth reflector having a fourth reflective surface that is parallel to the third reflective surface and is located behind the third reflective surface with respect to a normal direction of the third reflective surface, and a light-transmissive second base member; a third light source that emits a third light beam directed to the third reflective surface; and a fourth light source that emits a fourth light beam parallel to the third light beam, the fourth light beam passing in front of the third reflective surface and being directed to the fourth reflective surface, wherein the second base member includes a third main surface provided with the third reflector, and a fourth main surface that faces the third main surface and is provided with the fourth reflector, and the third reflective surface and the fourth reflective surface are disposed on the second reflection module such that the third light beam and the fourth light beam reflected by the third reflective surface and the fourth reflective surface, respectively, do not enter the first reflective surface and the second reflective surface of the first reflection module.

(6) The light source device according to (1) or (2) includes: a first reflection module provided with a third reflector having a third reflective surface that is parallel to the first reflective surface and the second reflective surface and is located behind the second reflective surface with respect to a normal direction of the second reflective surface, the first reflector, and the second reflector; and a third light source that emits a third light beam parallel to the first light beam and the second light beam, the third light beam passing in front of the first reflective surface and the second reflective surface and being directed to the third reflective surface, wherein the first reflection module reflects the incident first light beam, second light beam, and third light beam as reflected light beams parallel to each other.

(7) In the light source device according to (6), the first reflection module includes a light-transmissive first base member, and a light-transmissive second base member that is in contact with the first base member, the first base member includes a first main surface provided with the first reflective surface, and a second main surface facing the first main surface and provided with the second reflective surface, and the second base member includes a third main surface that is in contact with the second main surface, and a fourth main surface that faces the third main surface and is provided with the third reflective surface.

(8) The light source device according to (6) includes: a second reflection module provided with a fourth reflector having a fourth reflective surface, a fifth reflector having a fifth reflective surface that is parallel to the fourth reflective surface and is located behind the fourth reflective surface with respect to a normal direction of the fourth reflective surface, and a sixth reflector having a sixth reflective surface that is parallel to the fourth reflective surface and the fifth reflective surface and is located behind the fifth reflective surface with respect to a normal direction of the fifth reflective surface; a fourth light source that emits a fourth light beam directed to the fourth reflective surface; a fifth light source that emits a fifth light beam parallel to the fourth light beam, the fifth light beam passing in front of the fourth reflective surface and being directed to the fifth reflective surface; and a sixth light source that emits a sixth light beam parallel to the fourth light beam and the fifth light beam, the sixth light beam passing in front of the fourth reflective surface and the fifth reflective surface and being directed to the sixth reflective surface, wherein the second reflection module reflects the incident fourth light beam, fifth light beam, and sixth light beam as reflected light beams parallel to each other.

(9) In the light source device according to (8), the first reflection module includes a light-transmissive first base member and a light-transmissive second base member that is in contact with the first base member, the first base member includes a first main surface provided with the first reflective surface, and a second main surface facing the first main surface and provided with the second reflective surface, the second base member includes a third main surface that is in contact with the second main surface, and a fourth main surface that faces the third main surface and is provided with the third reflective surface, the second reflection module includes a light-transmissive third base member and a light-transmissive fourth base member that is in contact with the third base member, the third base member includes a fifth main surface provided with the fourth reflective surface, and a sixth main surface facing the fifth main surface and provided with the fifth reflective surface, the fourth base member includes a seventh main surface that is in contact with the sixth main surface, and an eighth main surface that faces the seventh main surface and is provided with the sixth reflective surface, and the fourth reflective surface and the fifth reflective surface are disposed on the third base member and the sixth reflective surface is disposed on the fourth base member such that the third light beam, the fourth light beam, and fifth light beam reflected by the fourth reflective surface, the fifth reflective surface, and the sixth reflective surface, respectively, do not enter the first reflective surface, the second reflective surface, and the third reflective surface of the first reflection module.

(10) A projection image display device includes: the light source device according to any one of (1) to (9); a light modulation element that modulates light incident from the light source device on the basis of an external signal; and a projection lens unit that magnifies and projects the light modulated by the light modulation element.

The present disclosure is applicable to a light source device or a projection image display device such as a projector.

What is claimed is:
1. A light source device comprising:
a first reflector having a first reflective surface;
a second reflector having a second reflective surface that is parallel to the first reflective surface and is located in a space behind the first reflective surface with respect to a normal direction of the first reflective surface;
a first light source that emits a first light beam directed to the first reflective surface;
a second light source that emits a second light beam that is parallel to the first light beam, the second light beam being directed to the second reflective surface through a space in front of the first reflective surface; and
a first reflection module including a first base member that is light-transmissive, the first base member including:
a first main surface on which the first reflector is provided, and
a second main surface on which the second reflector is provided, the second main surface being opposite to the first main surface.

2. The light source device according to claim 1, wherein the first light source is a light source array having a plurality of solid-state light sources arranged in a first direction, and
the second light source is a light source array having a plurality of solid-state light sources arranged in parallel with the first direction.

3. The light source device according to claim 1, further comprising:
a third reflector having a third reflective surface;
a fourth reflector having a fourth reflective surface that is parallel to the third reflective surface and is located in a space behind the third reflective surface with respect to a normal direction of the third reflective surface;
a third light source that emits a third light beam directed to the third reflective surface; and
a fourth light source that emits a fourth light beam that is parallel to the third light beam, the fourth light beam being directed to the fourth reflective surface through a space in front of the third reflective surface.

4. The light source device according to claim 1, further comprising:
a second reflection module including:
a third reflector having a third reflective surface,
a fourth reflector having a fourth reflective surface that is parallel to the third reflective surface and is located in a space behind the third reflective surface with respect to a normal direction of the third reflective surface, and
a second base member that is light-transmissive;
a third light source that emits a third light beam directed to the third reflective surface; and
a fourth light source that emits a fourth light beam that is parallel to the third light beam, the fourth light beam being directed to the fourth reflective surface through a space in front of the third reflective surface,
wherein
the second base member includes a third main surface on which the third reflector is provided, and a fourth main surface on which the fourth reflector is provided, the fourth main surface being opposite to the third main surface,
the third reflector is disposed on the second base member such that the third light beam reflected by the third reflective surface does not enter either the first reflective surface or the second reflective surface, and
the fourth reflector is disposed on the second base member such that the fourth light beam reflected by the fourth reflective surface does not enter either the first reflective surface or the second reflective surface.

5. The light source device according to claim 1, wherein the first reflection module further includes:
a third reflector having a third reflective surface that is parallel to the first reflective surface and the second reflective surface, and is located in a space behind the second reflective surface with respect to a normal direction of the second reflective surface,
the light source device further comprises a third light source that emits a third light beam that is parallel to the first light beam and the second light beam, the third light beam being directed to the third reflective surface through a space in front of the first reflective surface and the second reflective surface, and
the first reflection module reflects the first light beam, the second light beam, and the third light beam as reflected light beams parallel to each other.

6. The light source device according to claim 5, wherein the first reflection module further includes:
- a second base member that is light-transmissive and is in contact with the first base member, and
- the second base member includes a third main surface that is in contact with the second main surface, and a fourth main surface on which the third reflective surface is provided, the fourth main surface being opposite to the third main surface.

7. The light source device according to claim 5, further comprising:
- a second reflection module including:
  - a fourth reflector having a fourth reflective surface,
  - a fifth reflector having a fifth reflective surface that is parallel to the fourth reflective surface and is located in a space behind the fourth reflective surface with respect to a normal direction of the fourth reflective surface, and
  - a sixth reflector having a sixth reflective surface that is parallel to the fourth reflective surface and the fifth reflective surface, and is located in a space behind the fifth reflective surface with respect to a normal direction of the fifth reflective surface;
- a fourth light source that emits a fourth light beam directed to the fourth reflective surface;
- a fifth light source that emits a fifth light beam that is parallel to the fourth light beam, the fifth light beam being directed to the fifth reflective surface through a space in front of the fourth reflective surface; and
- a sixth light source that emits a sixth light beam that is parallel to the fourth light beam and the fifth light beam, the sixth light beam being directed to the sixth reflective surface through a space in front of the fourth reflective surface and the fifth reflective surface,
- wherein the second reflection module reflects the fourth light beam, the fifth light beam, and the sixth light beam as reflected light beams parallel to each other.

8. The light source device according to claim 7, wherein the first reflection module further includes:
- a second base member that is light-transmissive and is in contact with the first base member,
- the second base member includes a third main surface that is in contact with the second main surface, and a fourth main surface on which the third reflective surface is provided, the fourth main surface being opposite to the third main surface,
- the second reflection module includes:
  - a third base member that is light-transmissive, and
  - a fourth base member that is light-transmissive and is in contact with the third base member,
- the third base member includes a fifth main surface on which the fourth reflective surface is provided, and a sixth main surface on which the fifth reflective surface is provided, the sixth main surface being opposite to the fifth main surface,
- the fourth base member includes a seventh main surface that is in contact with the sixth main surface, and an eighth main surface on which the sixth reflective surface is provided, the eighth main surface being opposite to the seventh main surface,
- the fourth reflector is disposed on the third base member such that the fourth light beam reflected by the fourth reflective surface does not enter either the first reflective surface, the second reflective surface, or the third reflective surface,
- the fifth reflector is disposed on the third base member such that the fifth light beam reflected by the fifth reflective surface does not enter either the first reflective surface, the second reflective surface, or the third reflective surface, and
- the sixth reflector is disposed on the fourth base member such that the sixth light beam reflected by the sixth reflective surface does not enter either the first reflective surface, the second reflective surface, or the third reflective surface.

9. The light source device according to claim 1, further comprising a substrate on which both of the first light source and the second light source are mounted.

10. The light source device according to claim 1, wherein the first reflector and the second reflector reflect the first light beam and the second light beam as reflected light beams parallel to each other.

11. The light source device according to claim 1, wherein an incidence angle of the first light beam with respect to the first reflective surface is 45 degrees.

12. The light source device according to claim 1, wherein the first reflection module is configured to refract the second light beam on the first main surface and direct the second light beam to the second reflective surface.

13. The light source device according to claim 3, wherein the third reflective surface is parallel to the first reflective surface.

14. The light source device according to claim 3, wherein the fourth reflector is configured to allow the fourth light beam reflected by the fourth reflective surface to pass between the first reflector and the second reflector.

15. The light source device according to claim 4, wherein the second reflection module is configured to allow the third light beam reflected by the third reflective surface and the fourth light beam reflected by the fourth reflective surface to enter the first base member.

16. The light source device according to claim 15, wherein the second reflection module is configured to allow the fourth light beam incident on the first base member to pass between the first reflector and the second reflector.

17. The light source device according to claim 16, wherein the first reflection module is configured such that the fourth light beam passing through the first base member is parallel to the first light beam reflected by the first reflective surface.

18. A projection image display device comprising:
- the light source device according to claim 1;
- a light modulation element that modulates light incident from the light source device based on an external signal; and
- a projection lens unit that magnifies and projects the light modulated by the light modulation element.

* * * * *